(12) United States Patent
Vaquero Gonzalez et al.

(10) Patent No.: US 10,878,000 B2
(45) Date of Patent: Dec. 29, 2020

(54) EXTRACTING GRAPH TOPOLOGY FROM DISTRIBUTED DATABASES

(71) Applicant: HEWLETT PACKARD ENTERPRISE DEVELOPMENT LP, Houston, TX (US)

(72) Inventors: Luis Miguel Vaquero Gonzalez, Bristol (GB); Marco Aurelio Barbosa Fagnani Gomes Lotz, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 725 days.

(21) Appl. No.: 15/224,335

(22) Filed: Jul. 29, 2016

(65) Prior Publication Data

US 2018/0032603 A1    Feb. 1, 2018

(51) Int. Cl.
*G06F 16/28* (2019.01)
*G06F 16/2453* (2019.01)
*G06F 16/25* (2019.01)

(52) U.S. Cl.
CPC ...... *G06F 16/287* (2019.01); *G06F 16/24534* (2019.01); *G06F 16/25* (2019.01)

(58) Field of Classification Search
CPC .................................................... G06F 16/287
See application file for complete search history.

(56) References Cited

U.S. PATENT DOCUMENTS

| | | | |
|---|---|---|---|
| 9,229,952 B1* | 1/2016 | Meacham | G06F 16/219 |
| 2009/0259652 A1* | 10/2009 | Yamane | G06F 16/9024 |
| 2013/0006935 A1* | 1/2013 | Grisby | G06F 16/254 |
| | | | 707/635 |
| 2014/0108414 A1* | 4/2014 | Stillerman | G06F 16/00 |
| | | | 707/741 |
| 2014/0279808 A1* | 9/2014 | Strassner | G06Q 10/06 |
| | | | 706/47 |
| 2015/0324502 A1* | 11/2015 | Eberhardt | G06F 17/5004 |
| | | | 703/6 |
| 2017/0093645 A1* | 3/2017 | Zhong | G06F 3/0482 |
| 2017/0185674 A1* | 6/2017 | Tonkin | G06F 16/328 |
| 2018/0018402 A1* | 1/2018 | Vogler | G06F 16/9024 |

OTHER PUBLICATIONS

Aleks Aris and Ben Shneiderman, "A Node Aggregation Strategy to Reduce Complexity of Network Visualization using Semantic Substrates," 2008, pp. 1-8, University of Maryland, MD, USA.
Anand Bhalgat et al., "Fast Edge Splitting and Edmonds' Arborescence Construction for Unweighted Graphs," Jan. 2, 2009, pp. 1-15.
K. Xirogiannopoulos et al., "GraphGen: Exploring Interesting Graphs in Relational Data," Proceedings of the VLDB Endowment, 2015, pp. 2032-2035, vol. 8, No. 12, VLDB Endowment.

(Continued)

*Primary Examiner* — Dawaune A Conyers
(74) *Attorney, Agent, or Firm* — Hewlett Packard Enterprise Patent Department

(57) ABSTRACT

Example embodiments relate to extract graph topology from a plurality of databases. The example disclosed herein access metadata from a plurality of distributed databases. The example further access a set of predetermined rules to transform the accessed metadata into a graph description schema. The example finalizes when the visualization of the graph description schema is built.

16 Claims, 4 Drawing Sheets

(56) References Cited

OTHER PUBLICATIONS

Kang Min Yoo et al., "RDB2Graph: A Generic Framework for Modeling Relational Databases as Graphs," JIST2014, Nov. 9-11, 2014, Chian Mai, Thailand, pp. 1-4.

Neil Shah et al., "TimeCrunch: Interpretable Dynamic Graph Summarization," KDD'15, Aug. 10-13, 2015, Sydney, NSW, Australia, pp. 1-10, ACM.

Ning Zhang et al., "Discovery-Driven Graph Summarization," 2010 IEEE 26th International Conference on Data Engineering, 2010, pp. 1-12, IEEE.

Roberto De Virgilio et al., "Converting Relational to Graph Databases," GRADES 2013, Jun. 23, 2013, New York, NY, USA, pp. 1-6, ACM.

Roberto De Virgilio et al., "Model-Driven Design of Graph Databases", 2014, pp. 172-185, Springer International Publishing Switzerland.

Roberto De Virgilio et al., "R2G: a Tool for Migrating Relations to Graphs," EDBT 2014, 2014, pp. 640-643, OpenProceedings.org.

Saket Navlakha et al., "Graph Summarization with Bounded Error," SIGMOD'08, Jun. 9-12, 2008, Vancouver, BC, Canada, pp. 1-13, ACM.

Sangkeun Lee et al., "Table2Graph: A Scalable Graph Construction From Relational Tables using Map-Reduce," 2015 IEEE First International Conference on Big Data Computing Service and Applications, 2015, pp. 294-301, IEEE.

Yonathan Perez et al., "Ringo: Interactive Graph Analytics on Big-Memory Machines," SIGMOD' 15, May 31-Jun. 4, 2015; Melbourne, Victoria, Australia, pp. 1-6, ACM.

Vaquero, L.M. et al., "Sampling ISP Backbone Topologies," Feb. 2012, IEEE Communications Letters, vol. 6, No. 2, 3 pages.

Wu, Y. et al., "Graph Summarization for Attributed Graphs," Apr. 26, 2014, IEEE, 5 pages.

\* cited by examiner

EXTRACTING GRAPH TOPOLOGY FROM DISTRIBUTED DATABASES

BACKGROUND

Enterprises often store massive amounts of data in relational databases that are distributed across various geographies. Many interesting graphs are hidden in relational databases, and extracting those graphs and analyzing them could provide significant value.

BRIEF DESCRIPTION OF THE DRAWINGS

Features of the present disclosure are illustrated by way of example(s) and not limited in the following figure(s) in which like numerals indicate like elements, in which.

DETAILED DESCRIPTION

Figure 1:
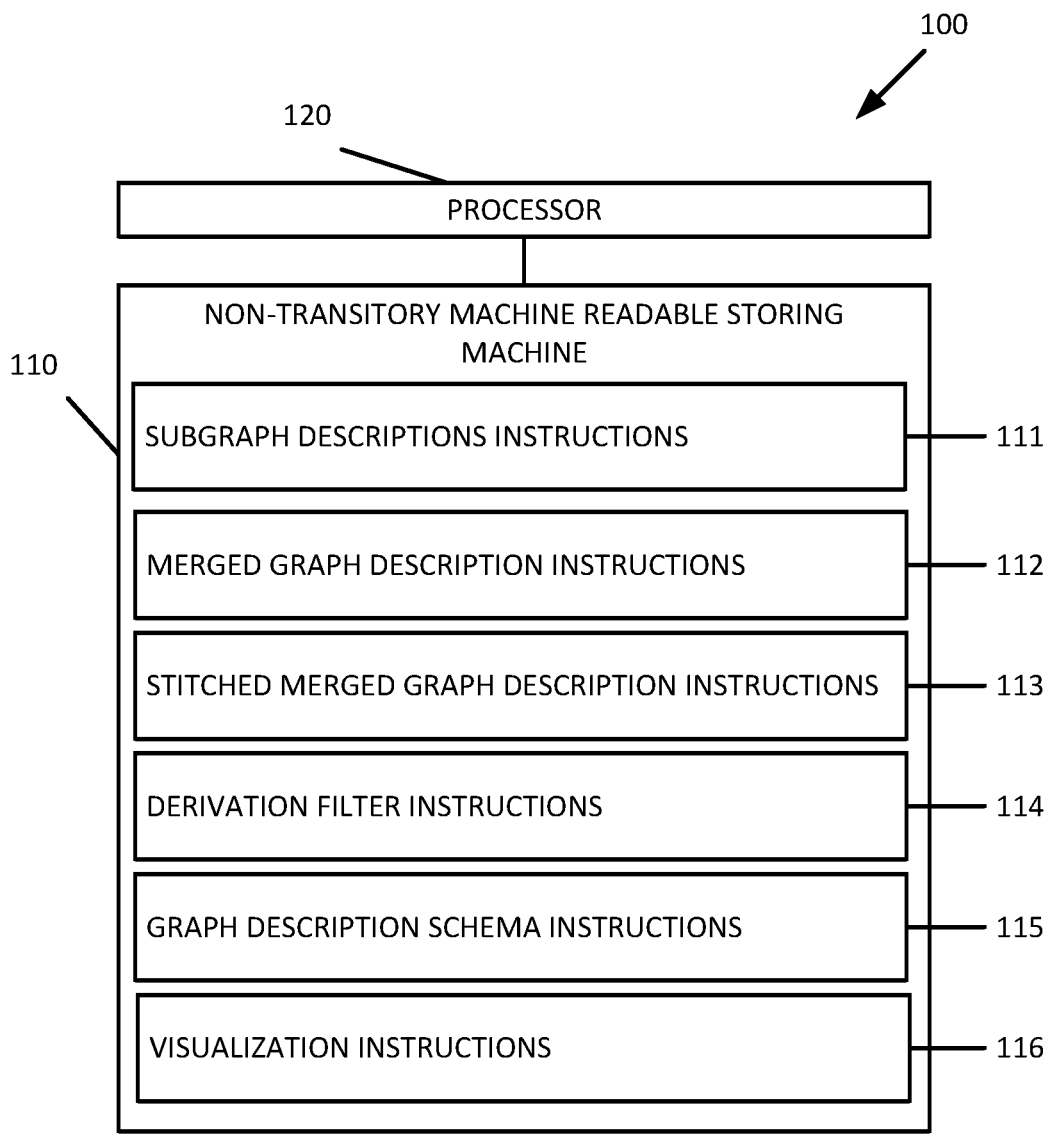
FIG. 1 is a flowchart illustrating a computer readable medium for extracting graph description topology from a plurality of distributed databases, according to an example of the present disclosure.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As mentioned above, enterprises often store massive amounts of data in relational databases that are distributed across various geographies. Many interesting graphs are hidden in relational databases, and extracting those graphs and analyzing them could provide significant value to the enterprise.

There are numerous technical challenges for a user who wants to explore such graphs, as the user is often forced to manually formulate the right Structured Query Language (SQL) queries to extract relevant data, write scripts to convert the results into the format required by some graph database system, load the data into those database systems, and write and execute the graph algorithms on the loaded graphs. This is a costly, labor-intensive, and cumbersome process, and possess a high barrier to using graph analytics.

In addition, exploring different potential graphs among the entities of interest is difficult and time-consuming in such a scenario. For example, in a library dataset such as the Digital Bibliography and Library Project (DBLP), the user may want to construct a graph with the authors as the nodes, but there are many ways to define the edges between the authors. Some of these graphs might be too sparse or too disconnected to yield useful insights, while others may exhibit high density or noise. Nonetheless, there may be also other graphs that are of interest or it may not be that clear which graphs are interesting to extract and analyze. Extracting all possible different graphs and understanding them would likely not be feasible, especially given that some of the graphs might be too large to extract.

A technical solution to this technical challenge is disclosed hereinafter. The present disclosure enables extraction of graph topology from relational databases, based on a predetermined set of rules, by using a combination of graph extracting, stitching, and derivation. In some examples, this combination may enable the creation of graph descriptions spanning different data sources at abstraction levels higher than the relational model (enabling both node and edge splits and spotting new relationships) using statistical techniques, machine learning techniques or a combination thereof. The present disclosure creates descriptors for query engines to materialize a subgraph of interest directly from the database.

Another technical challenge is that existing solutions cope only with data from a single database to build a single graph, and also rely very heavily on the database schema to find relationships between tables, or between rows in a table. Such existing solutions face a technical challenge and are not able to detect further relationships between entities from different databases. The present disclosure may provide a technical solution by being able to deal with graph descriptions that come from a plurality of relational databases and may have the mechanisms not only to abstract data in the relational model, but also to find new relationships between metadata from different databases. Thus, hidden relationships may be found between the plurality of distributed databases and therefore may add higher value to the enterprise.

A third technical challenge is that user may request information in a single visualization despite the fact that the data is distributed along a plurality of databases. Unlike existing systems, the technology disclosed herein allows a visualization of a different mapping, based on the information from a plurality of distributed databases and a set of predetermined rules. As such, the desired output is a single graph description schema filtered visualization, disclosed below.

The concept "topology" may be understood throughout the disclosure as a schematic description of the arrangement of entities, relationships and attributes in a set of databases.

In examples of the present disclosure, the system may have access to the plurality of relational database metadata and the administrator and user may have introduced a predetermined set of rules to the system.

In the present disclosure, "distributed databases" may be understood as any suitable data repositories. For example, the distributed databases may be in the form of suitable relational databases, hierarchical databases, network databases, object databases, or any other suitable form of database that allows interaction with a Database Management System (DBMS), Relational Database Management System (RDBMS) or a combination thereof.

Throughout the present disclosure, the term "description" may denote a set of entity types, link types and their representative attributes that characterize graphs embedded in relational databases.

Referring now to the drawings, FIG. 1 is a flowchart illustrating a computer readable medium for extracting graph description topology from a plurality of distributed databases, according to an example of the present disclosure.

FIG. 1 describes; a computer readable medium 100; a non-transitory machine readable storage machine 110; and a physical processor 120. The non-transitory machine readable storage machine 110 comprises subgraph descriptions instructions 111, merged graph description instructions 112, stitched merged graph description instructions 113, derivation filter instructions 114, graph description schema instructions 115, visualization instructions 116, and/or other instructions for extracting graph topology from distributed databases.

In an example, the instructions 111-116, and/or other instructions can be part of an installation package that can be executed by processor 120 to implement the functionality described herein. In such a case, non-transitory machine readable storage machine 110 may be a portable medium such as a CD, DVD, or flash device or a memory maintained by a computing device from which the installation package can be downloaded and installed. In another example, the program instructions may be part of an application or applications already installed in the computer readable medium 100.

The non-transitory machine readable storage machine 110 may be any electronic, magnetic, optical, or other physical storage device that contains or stores executable data accessible to the computer readable medium 100. Thus, non-transitory machine readable storage machine 110 may be, for example, a Random Access Memory (RAM), an Electrically Erasable Programmable Read-Only Memory (EEPROM), a storage device, an optical disc, and the like. Non-transitory machine readable storage machine 110 may be a non-transitory storage medium, where the term "non-transitory" does not encompass transitory propagating signals. Non-transitory machine readable storage machine 110 may be allocated in the computer readable medium 100 and/or in any other device in communication with the computer readable medium 100. As described in detail below, machine-readable storing medium 110 may be encoded with subgraph descriptions instructions 111, merged graph description instructions 112, stitched merged graph description instructions 113, derivation filter instructions 114, graph description schema instructions 115, and visualization instructions 116.

The instructions 111-116 may be machine readable instructions stored in the non-transitory machine readable storage machine 110 that are executable by the processor 120 to perform the instructions 111-116.

Figure 2:
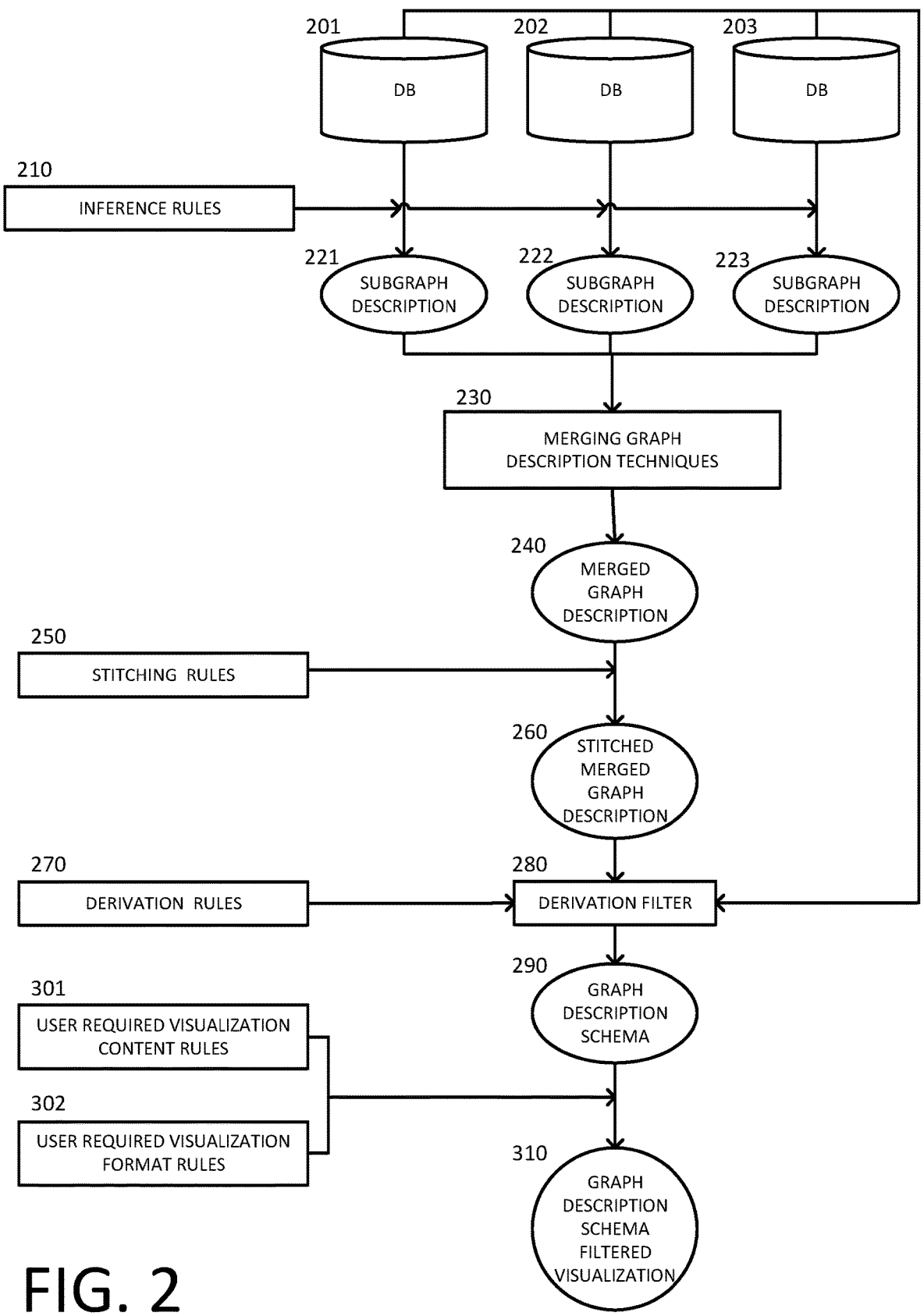
FIG. 2 is a schematic diagram for a method for extracting graph topology from a plurality of distributed databases, according to an example of the present disclosure.

FIG. 2 is a schematic diagram for a method for extracting graph topology from a plurality of distributed databases, according to an example of the present disclosure.

FIG. 2 describes; a plurality of distributed databases 201, 202, 203; a predetermined set of inference rules 210; a plurality of subgraph descriptions 221, 222, 223; merging graph description techniques 230; a merged graph description 240; a predetermined set of stitching rules 250; a stitched merged graph description 260; a predetermined set of derivation rules 270; a derivation filter 280; a graph description schema 290; a predetermined set of user required visualization content rules 301; a predetermined set of user required visualization format rules 302; and a graph description schema visualization 310.

While the present disclosure can extract metadata from any number of distributed databases, for clarity and merely by way of example without restricting the scope of the present disclosure, FIG. 2 shows an example with three relational databases 201, 202, 203.

Coming back to FIG. 1, the subgraph descriptions instructions 111, stored on non-transitory machine readable storage machine 110, when executed by processor 120, to cause the processor 120 to transform, based on a predetermined set of inference rules (e.g., inference rules 210), the accessed metadata from the databases (e.g., database 201, 202, 203) into a corresponding plurality of subgraph descriptions (e.g., subgraph descriptions 221, 222, 223).

In the example of the present disclosure, "inference rules" may be understood as a set of rules received by the system 100. The inference rules may for example, include instructions on how to extract subgraph descriptions from each of the relational database data and metadata. Inference rules may also comprise rules indicating which metadata datasets are requested to be processed aligned with the user query.

In the current disclosure, a "dataset" is to be understood as a collection of data. Some examples of datasets include the content of both a single and a plurality of database tables, a single statistical data matrix, Comma Separate Values (CSV) files and a DBS file (e.g. sqlite, which is a memory database system, offers a file format you can query using SQL).

In the example herein, "subgraph descriptions" may be understood as a description map transformation from the plurality of distributed data and metadata taking into account the predetermined set of inference rules in a one to one relationship, in other words, each database data and metadata is transformed into its corresponding subgraph description.

The processor 120 may execute the subgraph descriptions instructions 111 to access the metadata datasets from the plurality of distributed databases by either making SQL queries, or by accessing the previously exported schema of the databases. In some examples, partial database dumps may be exported to CSV files to be processed.

The processor 120 may further determine relationships between the datasets within each one of the plurality of distributed databases based on statistical relationships between datasets in the plurality of relational databases, pattern recognition associations between datasets in the plurality of databases, or a combination thereof. These relationships between the datasets within each one of the plurality of distributed databases may be used to transform the plurality of distributed databases into the corresponding plurality of subgraph descriptions by stitching the entities that are the same in different subgraphs to be the same on the merged graph.

For example, in FIG. 2 metadata datasets from the plurality of relational databases 201, 202, 203 are accessed. The data may be accessed by querying the databases using SQL, or by accessing a schema of the databases that has been previously exported as a file. In some examples, accessing the datasets of the plurality of relational databases may include exporting partial database dumps to CSV files.

The computer readable medium 100 may receive a predetermined set of inference rules 210. These inference rules 210 may comprise instructions on how to extract a subgraph description 221, 222, 223 from each of the relational databases 201, 202, 203. Inference rules 210 may also comprise rules indicating which metadata datasets are requested to be processed aligned with the user query.

Relationships between the datasets within each one of the plurality of distributed databases 201, 202, 203 may be determined based on statistical relationships between datasets in the plurality of databases, pattern recognition associations between datasets in the plurality of databases, or a combination thereof. These relationships between the datasets within each one of the plurality of distributed databases 201, 202, 203 may be used to transform the plurality of distributed databases 201, 202, 203 into the corresponding subgraph descriptions 221, 222, 223. Therefore, distributed database 201 may be transformed to subgraph description 221, distributed database 202 may be transformed to subgraph description 222, and distributed database 203 may be transformed to subgraph description 223.

Returning to FIG. 1, the merged graph description instructions 112, stored on non-transitory machine readable storage machine 110, when executed by processor 120, to cause the processor 120 to merge, using statistical techniques, machine learning techniques, or a combination thereof, the plurality of subgraph descriptions into a merged graph description.

In the example herein, the "merged graph description" may be understood as a description map transformation from the plurality of subgraph descriptions into one single graph, described hereinafter as merged graph description, using the merging graph description techniques revealed in the present disclosure.

The processor 120 executes the merged graph descriptions instructions 112 to find further relationships between the entities in the plurality of subgraph descriptions using merging graph description techniques which may be based on a clustering criteria.

"Entities" may be understood as a universal class of individuals, a unique thing in the modeled world or a drawing element in an entity relationship diagram (ERD).

The processor 120 may further cluster the plurality of subgraph descriptions into a merged graph description based on the relationships determined before.

For example, in FIG. 2 the plurality of subgraph descriptions 221, 222, 223 may be merged into a merged graph description 240 using merging graph description techniques 230. There are multiple merging graph description criteria. In one example the multiple merging graph description criteria includes repeated-entity merging graph techniques and/or similar-entity merging graph techniques. These techniques merge subgraph description entities from different subgraph descriptions, responsive to determining that the subgraph description entities are similar or the same as each other. In this way, the plurality of subgraph descriptions 221, 222, 223 may be clustered into a single merged graph description 240. A threshold within which subgraph description entities are considered similar may be set by the administrator. For example, for two given entities, may be considered similar if differences between them are within a range of tolerance such as a standard deviation. In another example, two entities may be considered similar based on a deviation probability. The administrator may use any appropriate clustering criteria and the present disclosure and the appended claims are not limited to the aforementioned examples.

Further criteria may be any clustering criteria based on having a common cause, for example; grouping errors, from a log of database errors, based on a single root cause and offer this as a single error type in the graph description to the user.

In the present disclosure "cause" may be understood as a producer of an effect, result or consequence or, in other words, as a condition that is responsible for an action or result.

The disclosed example herein may use the identified repeated or similar entities from different subgraph descriptions and cluster them together to create a single graph description map, referred hereinafter as merged graph description. Hence, this example does not only cluster the repeated or similar entities but also detects further hidden relationships between entities from different relational databases which provides higher value to the enterprise.

Returning to FIG. 1, the processor 120 may execute the stitched merged graph description instructions 113, stored on non-transitory machine readable storage machine 110, to transform, based on a set of predetermined stitching rules, the merged graph description into a stitched merged graph description.

In the current example, "stitching rules" may be comprised by a set of rules that may allow the merged graph description to detect further relationships, previously undetected between the entities of the merged graph description. The set of stitching rules may also allow the merged graph description to identify further similar entities within the merged graph description using statistical techniques, machine learning techniques, or a combination thereof.

In the example herein, the "stitched merged graph description" may be understood as a description map transformation from the merged graph by applying further entities relationships and further similar entities as described in the present disclosure.

The system 100 may receive a predetermined set of stitching rules from an administrator, may access the predetermined set of stitching rules from the non-transitory machine readable storage medium 110, and/or may otherwise access the predetermined set of stitching rules. Then, the processor 120 may execute the stitched merged graph description instructions 113 to detect, based on the stitching rules, further relationships within the entities of the merged graph description. Furthermore, the processor 120 may also identify, based on the inputted stitching rules, further similar entities within the merged graph description. The use of the stitching rules will be explained further below with respect to FIG. 2.

The processor 120 may also stitch the merged graph description into the stitched merged graph description based on the relationships and similar entities detected in the first instructions from the stitched merged graph description instructions 113.

For example, in FIG. 2 a predetermined set of stitching rules may be received by the system 100. Stitching rules 250 may be comprised by a set of rules that may allow the merged graph description 240 to detect further relationships, previously undetected between the entities of the merged graph description 240. The set of stitching rules 250 may also allow the merged graph description 240 to identify further similar entities within the merged graph description 240 using statistical techniques, machine learning techniques, or a combination thereof.

Three examples of how stitching rules are used by system 100 are explained below. Although three specific examples are described, these examples in no way limit the ways in which stitching rules may be used by system 100.

The first example of using stitching rules from the present disclosure may be applying string similarity techniques to the names of database fields and graphs properties. Then, correlation techniques may be applied on data belonging into fields with high name similarity. This first example may help identify similar entities by checking the name of the entities or its properties.

The second example of using stitching rules from the present disclosure may be calculating the variance of numeric fields. Then, identify those fields with the lowest variance and subsequently running causality-finding techniques to the identified lowest variance fields. This second example may help identify similar entities by checking the numerical data from its fields.

The third example of using stitching rules from the present disclosure may be the following. If the user knows that a field in a certain table and another field from another table are a different representation of the same data but the system 100 did not receive this relationship by the original database designer, then the system 100 may receive an indication from a user as to how the new relationship should be created. The third example may be relevant to the requester of the subgraph, since the user may know what he/she wants the best and, therefore, since machine learning techniques are used throughout the process, the system may learn from predilections of the user.

Returning to FIG. 1, the processor 120 may execute the derivation filter instructions 114, stored on non-transitory machine readable storage machine 110, to build a derivation filter.

In the example of the present disclosure, a derivation filter may be determined based on, for example, a predetermined set of derivation rules and data from the plurality of distributed databases.

"Derivation rules" may comprise a set of rules that may allow the administrator to filter what information should be hidden according to which user is requesting the information.

For example in FIG. 2, the stitched merged graph description 260 is transformed into a graph description schema 290 using a derivation filter 280.

In the present disclosure, the term "filter" is intended to be interpreted broadly to cover not merely hiding of information, but also a different mapping of the information, a further dataset connection builder, or a combination thereof.

The derivation filter 280 is a filter determined based on data and metadata from the plurality of distributed databases 201, 202, 203, and a predetermined set of derivation rules 270 inputted by the administrator.

Three examples of the use of derivation rules 270 are explained hereinafter. The following examples are simply examples and do not restrict the scope of the present specification, including the claims.

The first example of using derivation rules from the present disclosure may be applying community detection algorithms to tables containing information about people. Different communities are represented as different nodes in the graph despite being in the same table. This first example may apply a filter that may be useful in the cases when a different mapping of information is needed. Some examples of community filtering may be to access the information filtered per period, location or gender).

The second example of using derivation rules from the present disclosure may be applying decay function on time-stamped data in the database that created a graph streaming effect. This means some existing relationships in the database would be ignored in the graph view if they happen to be very old. This second example may apply a filter that may be useful in the cases where the old data is not relevant anymore.

The third example of using derivation rules from the present disclosure may be applying triadric closure (e.g. transitivity) to measure the strength of the connection of some edged in the data. It is a method commonly used in social networks to identify further connections between its users. This third example may apply a filter that may be useful in the cases when a filter as a further connection builder is required.

Returning to FIG. 1, the processor 120 may execute the graph description schema instructions 115, stored on non-transitory machine readable storage machine 110, to filter the stitched merged graph description into a graph description schema based on the derivation filter.

In the example herein, the "graph description schema" may be understood as a description map transformation from the stitched merged graph description applying a predetermined visualization filter that the administrator decided in form of derivation rules depending on which user is requesting the information.

The processor 120 may execute the visualization instructions 116, stored on non-transitory machine readable storage machine 110, to build a visualization based on the graph description schema.

The system 100 may receive a predetermined set of user required visualization content rules and a predetermined set of user required visualization format rules, may obtain these rules from the non-transitory machine readable storage media, and/or may otherwise access these rules.

The "predetermined set of user required visualization content rules" may be a set of predetermined rules received by the system 100 which comprise requested information aligned with the query of the user. In some examples, these rules may be the query that the user makes to the system. For example the user may query the system to check in multiple DBLPs which authors co-worked papers with other authors in a certain period of time.

The "predetermined set of user required visualization format rules" may be a set of predetermined rules received by the system 100 which comprise the requested format in which the user may want the requested query to be visualized. Some examples of the predetermined set of user required visualization format rules may be a table with authors as rows and published papers as columns or; an ERD as authors in the nodes, the connections with authors who they co-authored a paper with as the edges and the title, date and record ID as edge attributes. The previous connections may be identified between different relational databases.

The processor 120 may transform the graph description schema into a graph description schema filtered visualization based on the predetermined set of user required visualization content rules and the predetermined set of user required visualization format rules.

In the example herein, the "graph description schema filtered visualization" may be understood as a description map transformation from the graph description schema to a user visualization taking into account the user requested information and the user requested visualization format.

The processor 120 may also update the graph description schema filtered visualization based on new metadata entries in the plurality of distributed databases, new entries in the set of predetermined inference rules, new entries in the set of predetermined stitching rules, new entries in the set of predetermined derivation rules, new entries in the set of predetermined user required visualization content rules, new entries in the set of predetermined user required visualization format rules, or a combination thereof. The processor 120 may cause display the updated filtered graph description schema filtered visualization.

For example in FIG. 2, a graph description schema filtered visualization 310 is built from the graph description schema 290, a set of predetermined user required visualization content rules 301 and a set of predetermined user required visualization format rules 302.

The graph description schema filtered visualization 310 may be updated, based on new metadata entries in the plurality of distributed databases 201, 202, 203; new entries in the set of predetermined inference rules 210; new entries in the set of predetermined stitching rules 250; new entries in the set of predetermined derivation rules 210; new entries in the set of predetermined user required visualization content rules 301; new entries in the set of predetermined user required visualization format rules 301; or a combination thereof. The updated filtered graph description schema filtered visualization may be displayed.

The above described programmed hardware referred as a computer readable medium for extracting graph description topology from a plurality of distributed databases may implement the system engines as disclosed in the following example.

An example of the present disclosure further provides a system for extracting graph description topologies from a plurality of distributed databases. The system is described with reference to FIG. 3.

Figure 3:
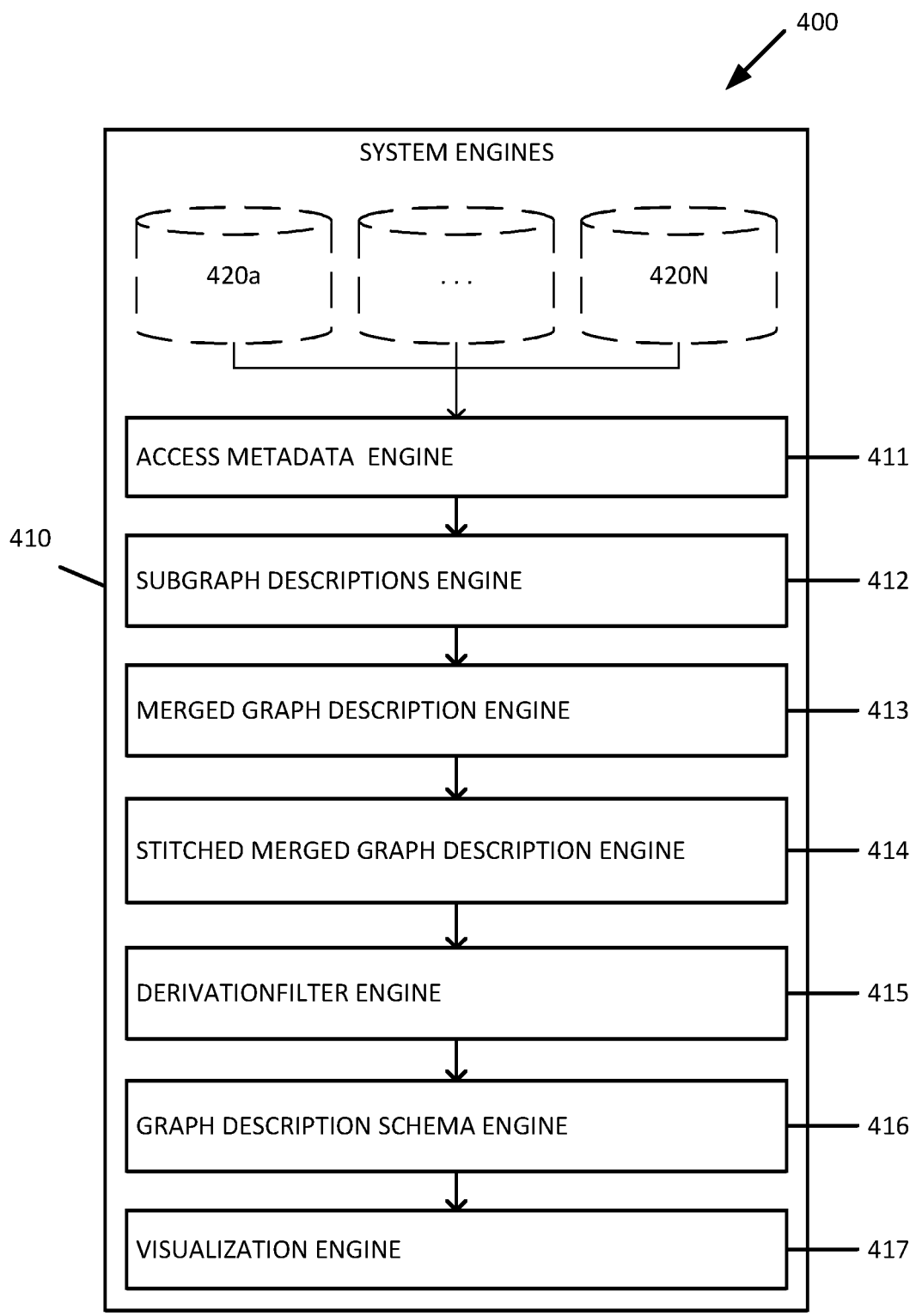
FIG. 3 is a block diagram illustrating a system for extracting graph description topology from a plurality of distributed databases, according to an example of the present disclosure.

FIG. 3 is a block diagram illustrating a system for extracting graph description topology from a plurality of distributed databases, according to an example of the present disclosure.

The system of the disclosed example comprises a set of engines that execute the instructions stored on the non-transitory machine readable storage medium disclosed in FIG. 1.

The system engines 410 comprise: an access metadata engine 411, a subgraph descriptions engine 412, a merged graph description engine 413, a stitched merged graph description engine 414, a derivation filter engine 415, a graph description schema engine 416, and visualization engine 417. The system engines 410 may have access to a plurality of distributed databases 420a-420N wherein N is a positive integer factor.

The access metadata engine 411 executes the instructions to access the data and metadata stored in the plurality of distributed databases either querying the distributed databases using SQL or accessing a previously exported database schema file. Sometimes exporting CSV files from partial database dumps may be needed and therefore executed by the access metadata engine 411.

The subgraph descriptions engine 412, executes statistical relationships between datasets in the plurality of distributed databases, pattern recognition associations between datasets in the plurality of databases, or a combination thereof in order to find relationships between the datasets within each one of the plurality of distributed databases. The subgraph description engine 412 may use the prior relationships to execute the transformation of the data and metadata from the plurality of distributed databases into the corresponding plurality of subgraph descriptions. The access metadata engine 411 may perform this functionality in a manner similar to or the same as subgraph description instructions 111 as described above with respect to FIG. 1.

The merged graph description engine 413, executes the transformation from the plurality of subgraph descriptions into a merged graph description using merging graph description techniques. The merged graph description engine 413 may use any merging graph description technique, but in the present example are used statistical and machine learning repeated-entity merging graph techniques and similar-entity merging techniques. The merged graph description engine 413 may perform this functionality in a manner similar to or the same as merged graph description instructions 112 as described above with respect to FIG. 1.

The stitched merged graph description engine 414, executes the transformation from the merged graph description into a stitched merged graph description using a set of predetermined stitching rules. Stitched merged graph description engine 414 is executed in order to detect further relationships, previously undetected between the entities of the merged graph description, and to identify further similar entities within the merged graph description to be clustered. The stitched merged graph description engine 414 may perform this functionality in a manner similar to or the same as stitched merged graph description instructions 113 as described above with respect to FIG. 1.

The derivation filter engine 415, executes the building up of the derivation filter using data and metadata from the plurality of distributed databases and a predetermined set of derivation rules. The derivation filter engine 415 may perform this functionality in a manner similar to or the same as derivation filter instructions 114 as described above with respect to FIG. 1.

The graph description schema engine 416, executes the transformation from the stitched merged graph description into a graph description schema using the derivation filter. Graph description schema engine 416 is executed in order to filter the outputted graph description according to the user requesting of information. The graph description schema engine 416 may perform this functionality in a manner similar to or the same as graph description schema instructions 115 as described above with respect to FIG. 1.

The visualization engine 417, executes the transformation from the graph description schema into a graph description schema filtered visualization using a set of predetermined user required visualization content rules and a set of user required visualization format rules. The visualization engine 417 may also execute the update of the graph description schema filtered visualization based on new metadata entries in the plurality of distributed databases, new entries in the set of predetermined inference rules, new entries in the set of predetermined stitching rules, new entries in the set of predetermined derivation rules, new entries in the set of predetermined user required visualization content rules, new entries in the set of predetermined user required visualization format rules, or a combination thereof. The visualization engine 417 may also execute the display of the updated filtered graph description schema filtered visualization. The visualization engine 417 may perform this functionality in a manner similar to or the same as visualization instructions 116 as described above with respect to FIG. 1.

The above described system for extracting graph description topology from a plurality of distributed databases may implement the method disclosed in the following example.

Figure 4:
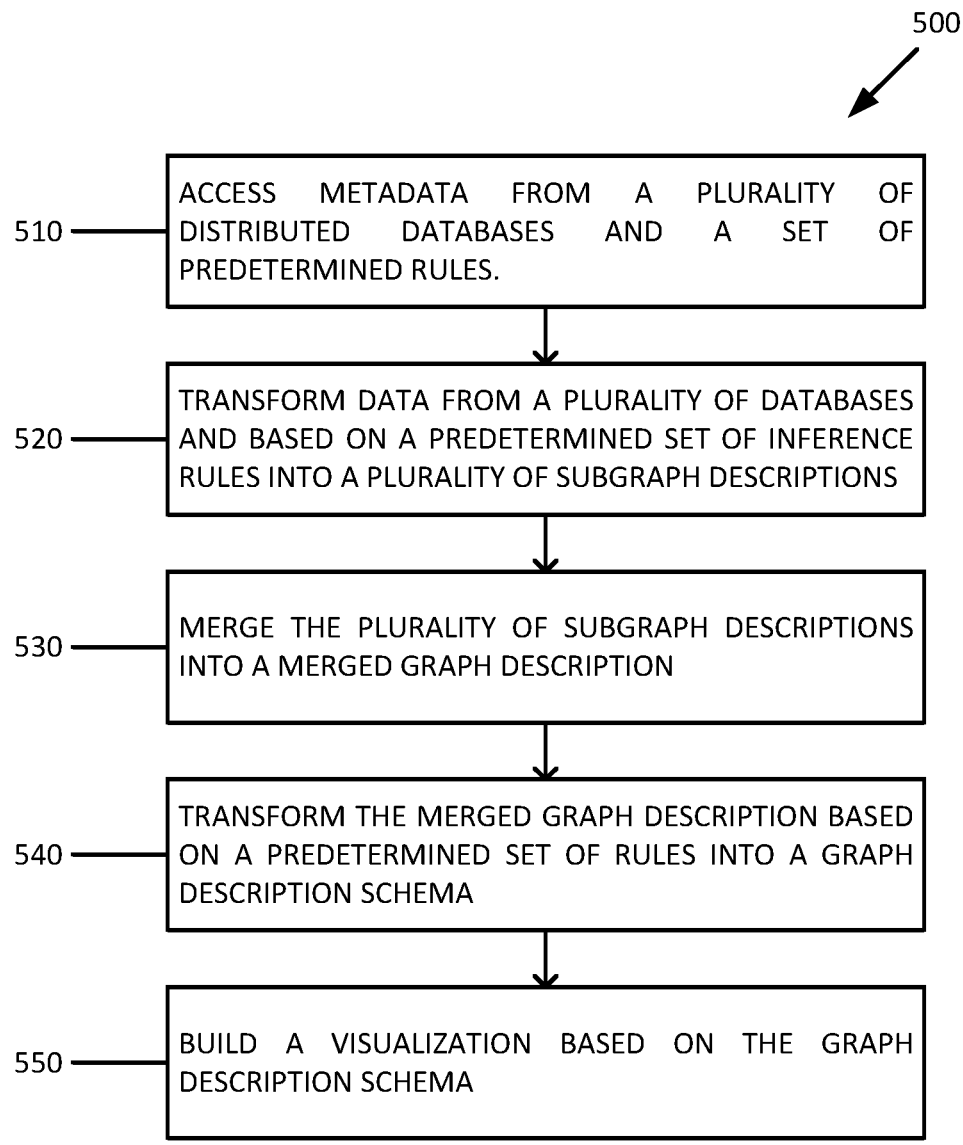
FIG. 4 is a flowchart illustrating a method for extracting graph description topology from a plurality of distributed databases, according to an example of the present disclosure.

FIG. 4 is a flowchart illustrating a method 500 for extracting graph description topology from a plurality of distributed databases, according to an example of the present disclosure. As shown in FIG. 4, the method includes the following operations. It is appreciated that method 500 as well as the methods described herein can, for example, be implemented in the form of machine readable instructions stored on memory of a computing system (see, e.g., the implementation of FIG. 3), executable instructions stored on a non-transitory machine readable storage medium (see, e.g., the implementation of FIG. 1), in the form of electronic circuitry, or another suitable form.

At block 510, metadata from a plurality of distributed databases and a set of predetermined rules is accessed. For example, system 100 (and/or subgraph descriptions instructions 111, access metadata engine 411, and/or another resource of system 100) may access metadata from the plurality of distributed databases and access the set of predetermined rules. The system 100 may access metadata from the plurality of distributed databases and access the set of predetermined rules in a manner similar or the same as that described above in relation to the execution of subgraph descriptions instructions 111, access metadata engine 411, and/or another resource of system 100.

At block 520, metadata from the plurality of distributed databases is transformed into a plurality of subgraph descriptions based on a predetermined set of inference rules. For example, system 100 (and/or subgraph description instructions 111, subgraph descriptions engine 412, and/or another resource of system 100) may transform data from a plurality of distributed databases and based on a predetermined set of inference rules into a plurality of subgraph descriptions. The system 100 may transform the plurality of distributed databases into a plurality of subgraph descriptions based on a predetermined set of inference rules in a manner similar or the same as that described above in relation to the execution of subgraph description instructions 111, subgraph descriptions engine 412, and/or another resource of system 100.

At block 530, the plurality of subgraph descriptions are clustered into a merged graph description. For example, system 100 (and/or merged graph description instructions 112, merged graph description engine 413, and/or another resource of system 100) may merge the plurality of subgraph descriptions into a merged graph description. The system 100 may cluster the plurality of subgraph descriptions into a merged graph description in a manner similar or the same as that described above in relation to the execution of merged graph description instructions 112, merged graph description engine 413, and/or another resource of system 100.

At block 540, the merged graph description is transformed into a graph description schema based on a predetermined set of rules. For example, system 100 (and/or stitched merged graph description instructions 113, derivation filter instructions 114, graph description schema instructions 115, stitched merged graph description engine 414, derivation filter engine 415, graph description schema engine 416, and/or another resource of system 100) may transform the merged graph description into a graph description schema based on a predetermined set of rules. The system 100 may transform the merged graph description into a graph description schema based on a predetermined set of rules in a manner similar or the same as that described above in relation to the execution of stitched merged graph description instructions 113, derivation filter instructions 114, graph description schema instructions 115, stitched merged graph description engine 414, derivation filter engine 415, graph description schema engine 416, and/or another resource of system 100.

At block 550, a visualization of the graph description schema is built. For example, system 100 (and/or visualization instructions 116, visualization engine 417, and/or another resource of system 100) may build a visualization based on the graph description schema. The system 100 may build a visualization of the graph description schema in a manner similar or the same as that described above in relation to the execution of visualization instructions 116, visualization engine 417, and/or another resource of system 100.

The filtered visualization of the graph description schema may be updated based on either new metadata entries in the plurality of databases or new entries in the set of predetermined rules. Then, the updated filtered visualization is displayed.

The above examples may be implemented by hardware, firmware, or a combination thereof. For example the various methods, processes and functional modules described herein may be implemented by a physical processor (the term processor is to be interpreted broadly to include CPU, processing module, ASIC, logic module, or programmable gate array, etc.). The processes, methods and functional modules may all be performed by a single processor or split between several processors; reference in this disclosure or the claims to a "processor" should thus be interpreted to mean "one or more processors". The processes, methods and functional modules are implemented as machine readable instructions executable by one or more processors, hardware logic circuitry of the one or more processors or a combination thereof.

The drawings in the examples of the present disclosure are some examples. It should be noted that some units and functions of the procedure are not necessarily essential for implementing the present disclosure. The units may be combined into one unit or further divided into multiple sub-units.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A method implemented by a computer system comprising a physical processor, the method comprising:
   accessing metadata from a plurality of distributed databases in response to a user query;
   transforming, based on inference rules that indicate which sets of metadata are requested to be processed for the user query, the accessed metadata of each of the distributed databases into a corresponding subgraph description of a plurality of subgraph descriptions;
   merging the plurality of subgraph descriptions of the distributed databases into a merged graph description, based on clustering, into a cluster, entities from different subgraph descriptions of the plurality of subgraph descriptions according to a determined similarity of the entities;
   identifying, using a stitching rule based on a string similarity between names of given entities, a further relationship between the given entities in the merged graph description, the further relationship undetected in the merged graph description;
   generating a stitched merged graph description based on the identified further relationship;
   transforming, based on derivation rules, the stitched merged graph description into a graph description schema, wherein the derivation rules indicate which information from the distributed databases is to be filtered out based on the user query; and
   building a visualization of a graph topology of the distributed databases based on the graph description schema and the user query, wherein the visualization of the graph topology shows an arrangement of entities in the distributed databases according to the user query.

2. The method of claim 1, wherein the transforming of the accessed metadata of each of the distributed databases into the corresponding subgraph description of the plurality of subgraph descriptions comprises:
   determining statistical relationships, pattern recognition associations, or a combination thereof between datasets in the plurality of distributed databases.

3. The method of claim 1, further comprising:
building a filtered visualization based on user required visualization format rules, user required visualization content rules, and the graph description schema; and
causing display of the filtered visualization.

4. The method of claim 3, further comprising:
updating, based on either new metadata entries in the plurality of distributed databases or new entries in the user required visualization format rules, the filtered visualization; and
causing display of the updated filtered visualization.

5. The method of claim 1, wherein the identifying of the further relationship between the given entities uses the stitching rule that is further based on variances of numeric fields of the given entities.

6. The method of claim 1, wherein the transforming of the stitched merged graph description into the graph description schema is based on the derivation rules that further apply a community detection algorithm that represents different communities of data of a common table as different nodes in the graph topology.

7. The method of claim 1, wherein the transforming of the stitched merged graph description into the graph description schema is based on the derivation rules that further apply a decay function on timestamped data to cause an older relationship between entities to not be depicted in the graph topology.

8. A system comprising:
a physical processor; and
a non-transitory storage medium storing machine readable instructions executable on the physical processor to:
access metadata from a plurality of distributed databases in response to a user query;
transform, based on inference rules that indicate which sets of metadata are requested to be processed for the user query, the accessed metadata of each of the distributed databases into a corresponding subgraph description of a plurality of subgraph descriptions;
merge the plurality of subgraph descriptions of the distributed databases into a merged graph description, based on clustering, into a cluster, entities from different subgraph descriptions of the plurality of subgraph descriptions according to a determined similarity of the entities;
transform, based on stitching rules, the merged graph description into a stitched merged graph description, the transforming of the merged graph description into the stitched merged graph description identifying a further relationship between given entities in the merged graph description, the further relationship hidden in the merged graph description, wherein the identifying uses a stitching rule that is based on variances of numeric fields of the given entities;
transform, based on a derivation filter, the stitched merged graph description into a graph description schema, wherein the derivation filter is to filter out information from the distributed databases based on the user query; and
build a visualization of a graph topology of the distributed databases based on the graph description schema and the user query, wherein the visualization of the graph topology shows an arrangement of entities in the distributed databases according to the user query.

9. The system of claim 8, wherein the machine readable instructions are executable on the physical processor to:
transform the stitched merged graph description into the graph description schema by filtering, based on the derivation filter, data from the plurality of distributed databases that does not match conditions in the derivation filter.

10. The system of claim 8, wherein the identifying of the further relationship between the given entities uses the stitching rule that is further based on a string similarity between names of the given entities.

11. The system of claim 8, wherein the transforming of the stitched merged graph description into the graph description schema is based on the derivation filter that further applies a community detection algorithm that represents different communities of data of a common table as different nodes in the graph topology.

12. The system of claim 8, wherein the transforming of the stitched merged graph description into the graph description schema is based on the derivation filter that further applies a decay function on timestamped data to cause an older relationship between entities to not be depicted in the graph topology.

13. A non-transitory machine-readable storage medium comprising instructions that upon execution cause a system to:
access metadata from a plurality of distributed databases in response to a user query;
transform, based on inference rules that indicate which sets of metadata are requested to be processed for the user query, the accessed metadata of each of the distributed databases into a corresponding subgraph description of a plurality of subgraph descriptions;
merge the plurality of subgraph descriptions of the distributed databases into a merged graph description, based on clustering, into a cluster, entities from different subgraph descriptions of the plurality of subgraph descriptions according to a determined similarity of the entities;
identify, using a stitching rule, a further relationship between given entities in the merged graph description, the further relationship hidden in the merged graph description;
generate a stitched merged graph description based on the identified further relationship;
transform, based on derivation rules, the stitched merged graph description into a graph description schema, wherein the derivation rules indicate which information from the distributed databases is to be filtered out based on the user query;
build a filtered visualization of the distributed databases based on the graph description schema, user required visualization format rules, and user required visualization content rules, wherein the filtered visualization shows an arrangement of entities in the distributed databases according to the user query, wherein the transforming of the stitched merged graph description into the graph description schema is based on the derivation rules that further apply a decay function on timestamped data to cause an older relationship between entities to not be depicted in the filtered visualization; and
cause display of the filtered visualization.

14. The non-transitory machine-readable storage medium of claim 13, wherein the instructions upon execution cause the system to:
transform the stitched merged graph description into the graph description schema by filtering, based on the derivation rules, data from the plurality of distributed databases that does not match conditions in the derivation rules.

15. The non-transitory machine-readable storage medium of claim 13, wherein the identifying of the further relationship between the given entities uses the stitching rule that is based on a string similarity between names of the given entities.

16. The non-transitory machine-readable storage medium of claim 13, wherein the identifying of the further relationship between the given entities uses the stitching rule that is based on variances of numeric fields of the given entities.

* * * * *